United States Patent
Kim et al.

(10) Patent No.: US 10,905,116 B2
(45) Date of Patent: Feb. 2, 2021

(54) ANTIMICROBIAL FABRIC ASSEMBLIES

(71) Applicant: Higher Dimension Materials, Inc., Oakdale, MN (US)

(72) Inventors: Young-Hwa Kim, Hudson, WI (US); Richard D. Olmsted, Vadnais Heights, MN (US); Nusrallah Jubran, St. Paul, MN (US)

(73) Assignee: Higher Dimension Materials, Inc., St. Paul, MN (US)

( * ) Notice: Subject to any disclaimer, the term of this patent is extended or adjusted under 35 U.S.C. 154(b) by 0 days.

(21) Appl. No.: 16/091,031

(22) PCT Filed: Apr. 4, 2017

(86) PCT No.: PCT/US2017/025977
§ 371 (c)(1),
(2) Date: Oct. 3, 2018

(87) PCT Pub. No.: WO2017/176780
PCT Pub. Date: Oct. 12, 2017

(65) Prior Publication Data
US 2019/0110471 A1    Apr. 18, 2019

Related U.S. Application Data

(60) Provisional application No. 62/318,059, filed on Apr. 4, 2016.

(51) Int. Cl.
*A01N 25/34* (2006.01)
*A41D 31/30* (2019.01)
(Continued)

(52) U.S. Cl.
CPC .......... *A01N 25/34* (2013.01); *A41D 31/305* (2019.02); *B32B 3/08* (2013.01); *B32B 5/02* (2013.01);
(Continued)

(58) Field of Classification Search
CPC ........ A01N 25/34; A01N 33/12; A01N 59/16; A01N 59/00; A41D 31/305; B32B 3/08; B32B 2305/18; B32B 2307/7145
See application file for complete search history.

(56) References Cited

U.S. PATENT DOCUMENTS 4,810,559 A    3/1989   Fortier et al.
4,842,932 A    6/1989   Burton
(Continued)

FOREIGN PATENT DOCUMENTS

CN    1398342    2/2003
CN    101802131    8/2010
(Continued)

OTHER PUBLICATIONS

Ishizuka, Inorganic silver antimicrobial, 2014, Ishizuka, 2 pages. (Year: 2014).*

(Continued)

*Primary Examiner* — Trevor Love
(74) *Attorney, Agent, or Firm* — Fish & Richardson P.C.

(57) ABSTRACT

In some example, the disclosure relates to a fabric assembly comprising a flexible substrate including a top surface; a plurality of plates attached to the top surface of the flexible substrate and arrayed in a pattern such that a plurality of continuous gaps are defined between adjacent plates; and one or more antibacterial agents are contained in or on at least one of the substrate and the plurality of guard plates wherein the antimicrobial agents are selected to reduce the fabric assembly's surface population of at least one of bacteria, virus, mold, fungus, or algae.

19 Claims, 8 Drawing Sheets

(51) Int. Cl.
B32B 5/02 (2006.01)
B32B 3/08 (2006.01)
A01N 33/12 (2006.01)
A01N 59/16 (2006.01)
A01N 59/00 (2006.01)

(52) U.S. Cl.
CPC .............. *A01N 33/12* (2013.01); *A01N 59/16* (2013.01); *B32B 2305/18* (2013.01); *B32B 2307/7145* (2013.01)

(56) References Cited

U.S. PATENT DOCUMENTS

| | | | |
|---|---|---|---|
| 4,906,466 | A | 3/1990 | Edwards et al. |
| 6,641,842 | B2 | 11/2003 | Laridon et al. |
| 6,962,739 | B1* | 11/2005 | Kim .......................... B32B 3/08 428/47 |
| 7,018,692 | B2 | 3/2006 | Kim et al. |
| 7,147,845 | B2 | 12/2006 | Capelli |
| 7,479,476 | B2 | 1/2009 | Ashworth et al. |
| 7,771,738 | B2 | 8/2010 | Sugiura et al. |
| 8,183,167 | B1 | 5/2012 | Delattre et al. |
| 8,231,883 | B2 | 7/2012 | Sugiura |
| 8,232,305 | B2 | 7/2012 | Elder et al. |
| 2004/0192133 | A1 | 9/2004 | Kim et al. |
| 2005/0129929 | A1 | 6/2005 | Patton et al. |
| 2013/0180056 | A1* | 7/2013 | Rock ....................... D06M 11/50 8/137 |
| 2013/0209735 | A1* | 8/2013 | Kim .......................... B32B 3/14 428/141 |

FOREIGN PATENT DOCUMENTS

| | | |
|---|---|---|
| CN | 104203125 | 12/2014 |
| JP | 2011068130 | 4/2011 |
| WO | WO 2007054074 | 5/2007 |
| WO | WO 2012166624 | 12/2012 |

OTHER PUBLICATIONS

Ishizuka, Summary, 2014, Ishizuka, 1 page. (Year: 2014).*
Response to Communication Pursuant to Rules 161(1) and 162 EPC dated Nov. 20, 2018 from counterpart European Application No. 17718262.3, filed May 15, 2019, 11 pp.
Gao et al., "Recent Advances in Antimicrobial Treatments of Textiles," Textile Research Journal, vol. 78, Issue 1, Jan. 2008, 13 pp.
Glass et al., "The effectiveness of a u-v toothbrush sanitizing device in reducing the number of bacteria, yeasts and viruses on toothbrushes," Oklahoma Dental Association Journal, Apr. 24, 1994, 7 pp.
Hughes et al., "The Nosocomial Colonization of T.Bear," Infection Control, vol. 7, No. 10, Jan. 1986, 8 pp.
International Preliminary Report on Patentability from International Application No. PCT/US2017/025977, dated Oct. 18, 2018, 7 pp.
Kwakye-Awuah et al., "Antimicrobial action and efficiency of silver-loaded zeolite X," Journal of Applied Microbiology, Oct. 25, 2007, 9 pp.
Lansdown, "A review of the use of silver in wound care: facts and fallacies," The British Journal of Nursing, Tissue Viability, Mar. 2004, 15 pp.
Luosujarvi et al., "Joint symptoms and diseases associated with moisture damage in a health center," Clinical Rheumatology, Apr. 29, 2003, 5 pp.

Silvestry-Rodriguez et al., "Silver as a Disinfectant," Reviews of environmental contamination and toxicology, Feb. 2007, 23 pp.
Matsumura et al., "Mode of Bactericidal Action of Silver Zeolite and Its Comparison with That of Silver Nitrate," American Society for Microbiology, vol. 69, No. 7, Apr. 29, 2003, 4 pp.
Novak et al., "Chlamydia trachomatis can be Transmitted by a Nonporous Plastic Surface In Vitro," Cornea, vol. 14, No. 5, Sep. 1995, 4 pp.
Purwar et al., "Recent Developments in Antimicrobial Finishing of Textiles—A Review," AATCC Review, Mar. 2004, 7 pp.
Russell, "Whither Triclosan," Journal of Antimicrobial Chemotherapy, Apr. 8, 2004, 3 pp.
Sakaoka et al., "Two Outbreaks of Herpes Simplex Virus Type 1 Nosocomial Infection among Newborns," Journal of Clinical Microbiology, vol. 24, No. 1, Jul. 1986, 5 pp.
Schierholz et al., "Efficacy of silver-coated medical devices," Journal of Hospital Infection, vol. 40, Issue 4, Dec. 1998, 6 pp.
Simoncic et al., "Structures of Novel Antimicrobial Agents for Textiles—A Review," Textile Research Journal, vol. 80, Mar. 18, 2010, 17 pp.
Sundkvist et al., "Outbreak of hepatitis A spread by contaminated drinking glasses in a public house," Communicable Disease and Public Health, vol. 3, No. 1, Mar. 2000, 3 pp.
Swathy et al., "Antimicrobial silver: An unprecedented anion effect," Scientific Reports, Nov. 24, 2014, 5 pp.
Ware et al., "Reviews of Environmental Contamination and Toxicology," Springer, ISBN-13: 978-0-387-69162-6, vol. 191, 2007, 25 pp. (Applicant points out, in accordance with MPEP 609.04(a), that the year of publication, 2007, is sufficiently earlier than the effective U.S. filing date, so that the particular month of publication is not in issue.).
Yoshikawa et al., "Rapid Contamination of the Environments with Varicella-Zoster Virus DNA from a Patient with Herpes Zoster," Brief Report, Journal of Medical Virology, Jan. 26, 2000, 3 pp.
Das et al., "Carbapenem-resistant Acinetobacter and role of curtains in an outbreak in intensive care units," Journal of Hospital Infection, vol. 50, Issue 2, Feb. 2002, 5 pp.
International Search Report and Written Opinion of International Application No. PCT/US2017/025977, dated Jul. 3, 2017, 12 pp.
Martinez et al., "Role of Environmental Contamination as a Risk Factor for Acquisition of Vancomycin-Resistant Enterococci in Patients Treated in a Medical Intensive Care Unit," Arch. Intern Med., vol. 163, Sep. 8, 2003, pp. 1905-1912.
Sakaoka et al., "Two Outbreaks of Herpes Simplex Virus Type 1 Nosocomial Infection Among Newborns," J. Clin. Microbiol., vol. 24, No. 1, Jul. 1986, pp. 36-40.
Examination Report from counterpart European Application No. 17718262.3, dated Nov. 21, 2019, 4 pp.
Written Opinion from counterpart Singaporean Application No. 11201808670X, dated Dec. 19, 2019, 5 pp.
Response to Extended Search Report dated Nov. 21, 2019, from counterpart European Application No. 17718262.3, filed Mar. 24, 2020, 50 pp.
Response to Singapore Office Action dated Dec. 19, 2019, from counterpart Singapore application No. 11201808670x, filed May 14, 2020, 14 pp.
Gao et al., "Characteristics and Application of Inorganic Ag System Antimicrobial Agents," Journal of Liaoning University Natural Sciences Edition, Aug. 2000, 27(3):264-270 (with English abstract).
Nano Antibacterial Technology, 1st ed., Chemical Industry Press, Jan. 2008, p. 190 (with Machine Translation).
Examination Report from counterpart European Application No. 17718262.3, dated Jul. 1, 2020, 3 pp.
First Office Action and Search Report, and translation thereof, from counterpart Chinese Application No. 201780034791.1, dated Aug. 4, 2020, 24 pp.

* cited by examiner

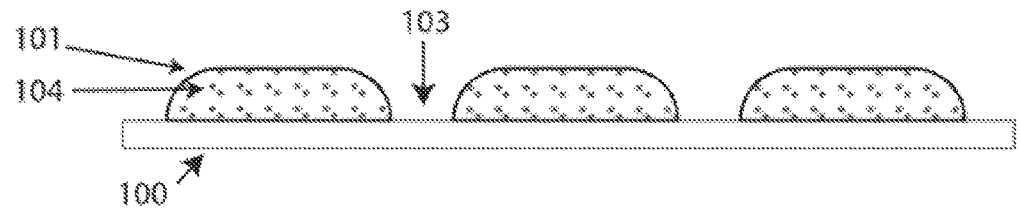
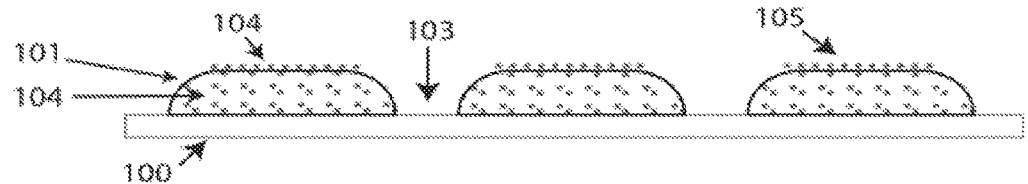
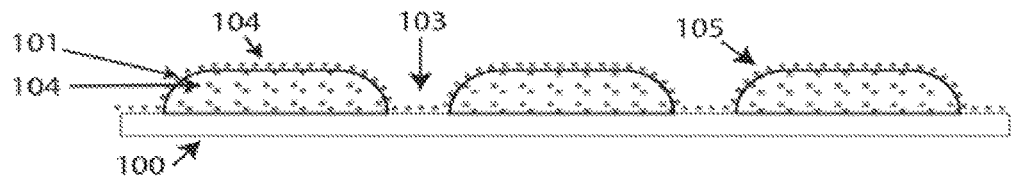
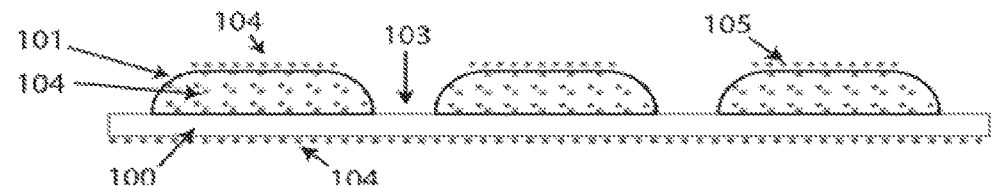
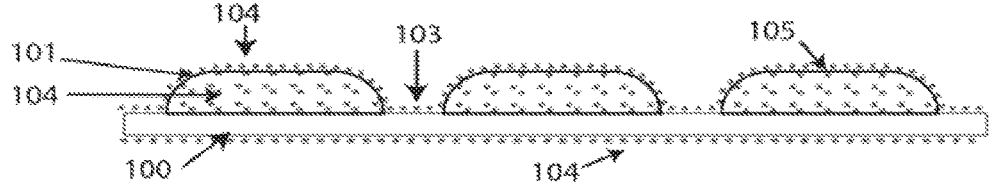
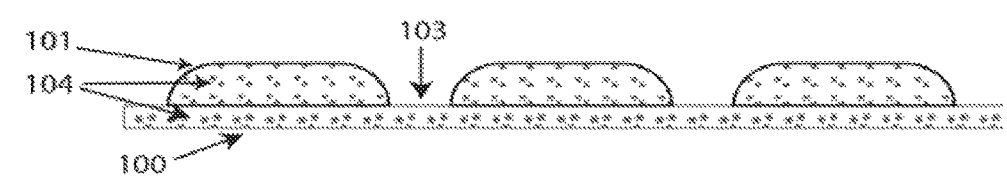
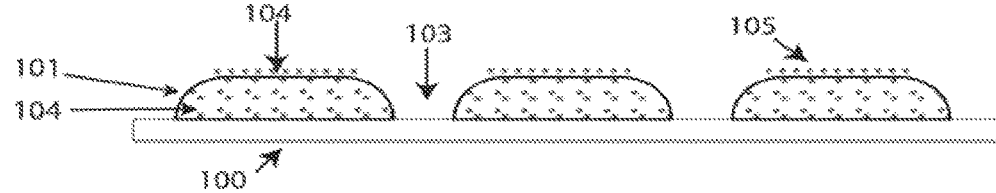

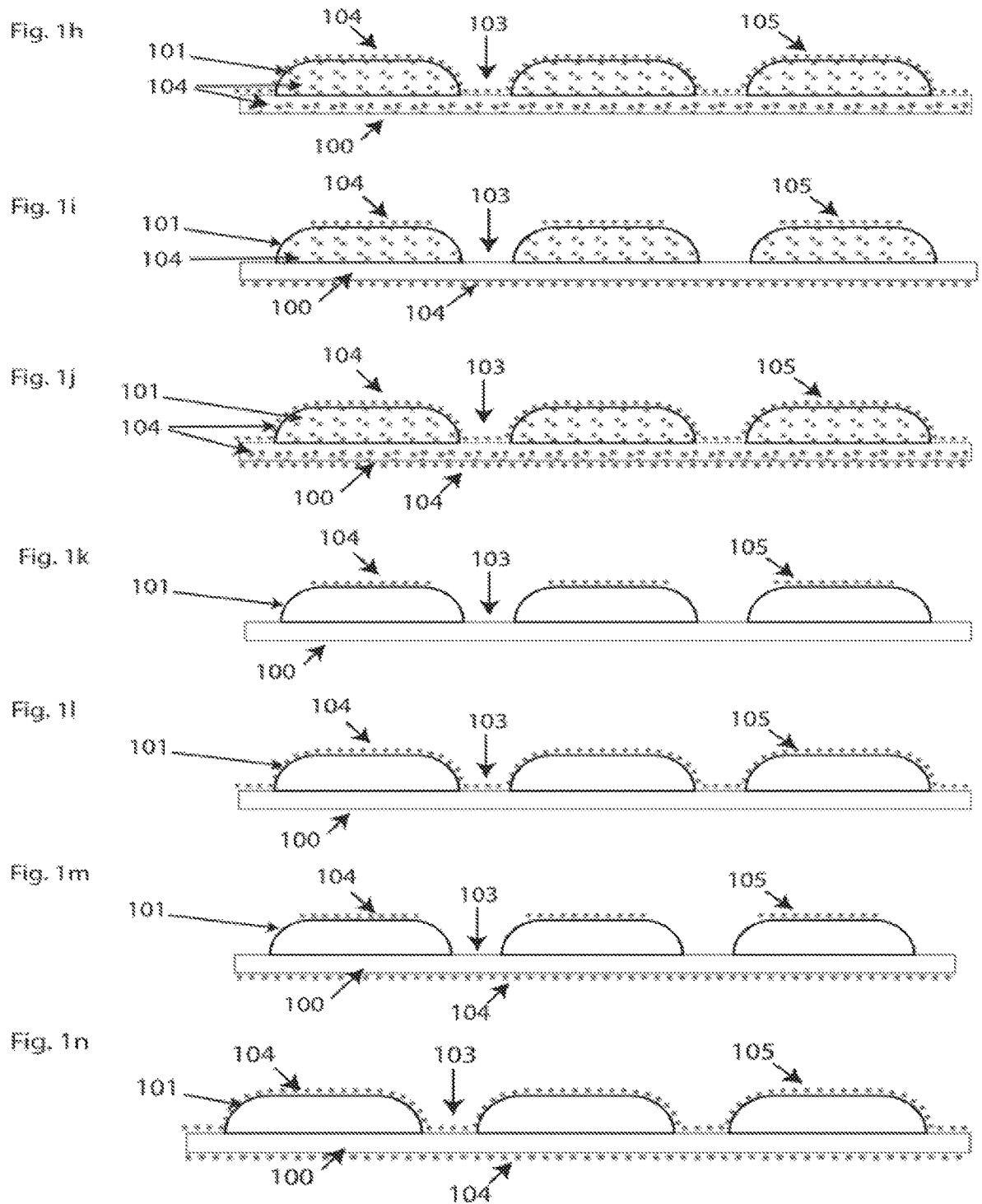

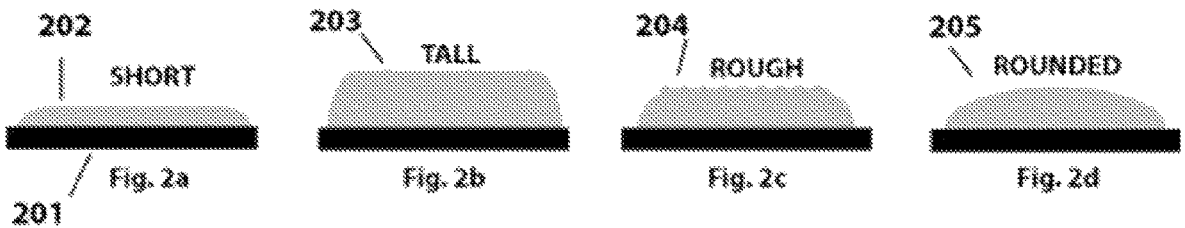
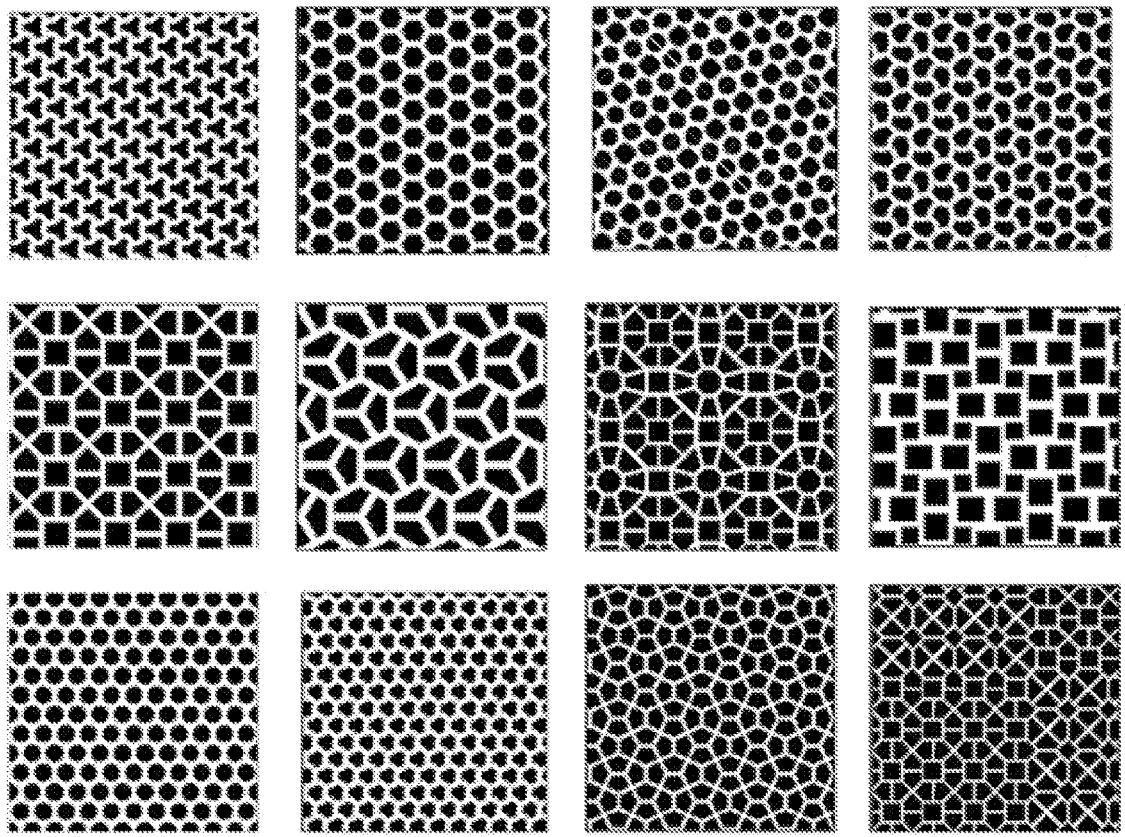
FIG. 3

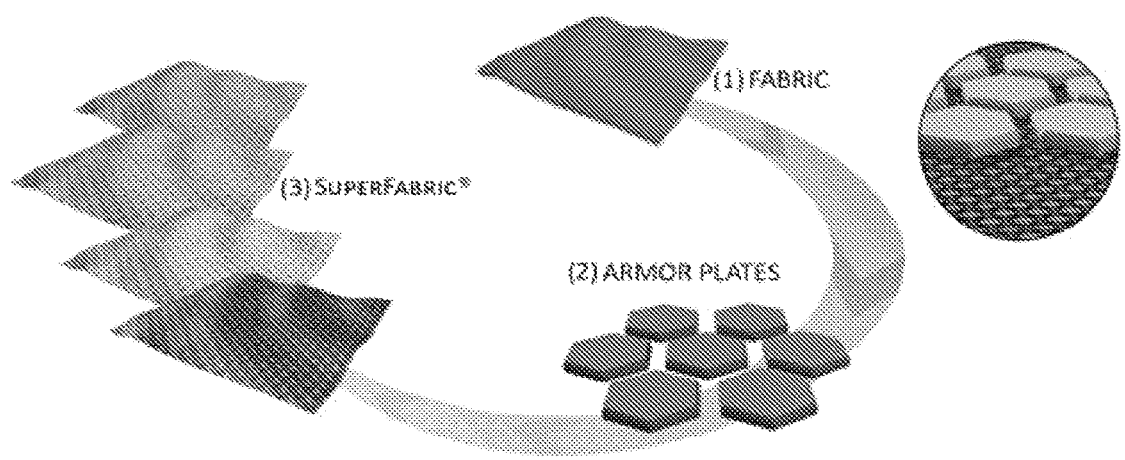
FIG. 7

ANTIMICROBIAL FABRIC ASSEMBLIES

This is a National Stage filing under 35 U.S.C. 371 of International Application No. PCT/US2017/025977, filed Apr. 4, 2017, which claims the benefit of U.S. Provisional Application No. 62/318,059, filed Apr. 4, 2016, the entire content of each application is incorporated herein by reference.

This application claims the benefit of U.S. Provisional Application No. 62/318,059, filed Apr. 4, 2016, which is incorporated herein by reference in its entirety.

TECHNICAL FIELD

In some examples, the disclosure relates to protective fabric materials that can be used in clothing, gloves, boots, furniture, transportation seating, and other applications where fabric is commonly used.

SUMMARY

In some examples, the disclosure is directed to antimicrobial fabric assemblies and methods for making and using the same. The fabric assemblies may include fabric substrates (e.g., woven, non-woven, or knitted fabric substrates) including a plurality of guard plates affixed to and separated by gaps on the surface of the fabric substrate. The guard plates may be formed by curing a polymer material following deposition of the polymer material, e.g., via screen printing, on the fabric substrate. The fabric assembly includes one or more antimicrobial agents contained in or on at least one of the substrate or plurality of guard plates. The antimicrobial agent may be configured to reduce the fabric assembly's surface population of at least one of bacteria, virus, mold, fungus, or algae.

In one example, the disclosure relates to a fabric assembly comprising a flexible substrate including a top surface; a plurality of guard plates affixed to the top surface of the flexible substrate and arrayed in a pattern such that a plurality of continuous gaps are defined between adjacent plates; and one or more antimicrobial agents contained in and/or on at least one of the substrate and plurality of guard plates, and wherein the antimicrobial agents are selected to reduce the fabric assembly's surface population of at least one of bacteria, virus, mold, fungus, or algae.

In another example, the disclosure relates to a method comprising forming a plurality of guard plates affixed to a top surface of a flexible substrate and arrayed in a pattern such that a plurality of continuous gaps are defined between adjacent plates, wherein the fabric assembly includes one or more antimicrobial agents contained in and/or on at least one of the substrate and plurality of guard plates, and wherein the antimicrobial agents are selected to reduce the fabric assembly's surface population of at least one of bacteria, virus, mold, fungus, or algae The details of one or more examples are set forth in the accompanying drawings and the description below. Other features, objects, and advantages will be apparent from the description and drawings, and from the claims.

BRIEF DESCRIPTION OF DRAWINGS

FIGS. 2(a)-2(d) are conceptual diagrams illustrating various example cross sections for example guard plates.

FIG. 3 is a plan view illustration of an example fabric assembly showing example plate shapes, plate patterns, and variations in gap widths.

FIG. 7 is a schematic diagram illustrating an example process with which components of plates, gaps, and flexible substrate are combined into a fabric assembly.

DETAILED DESCRIPTION

Figure 1O:
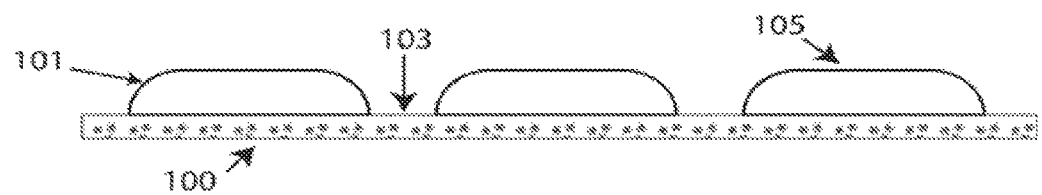
FIGS. 1(a)-1(s) are conceptual diagrams illustrating example antimicrobial fabric assemblies in accordance with this disclosure.
Figure 1P:
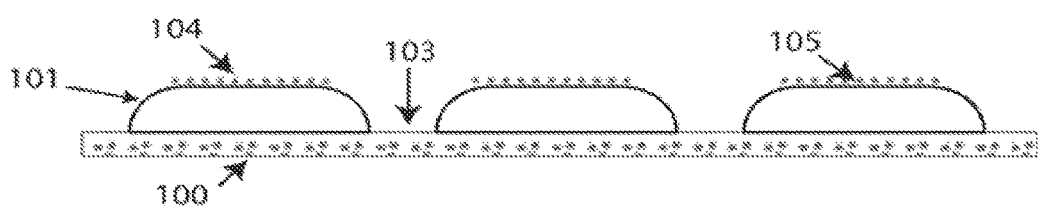
Figure 1Q:
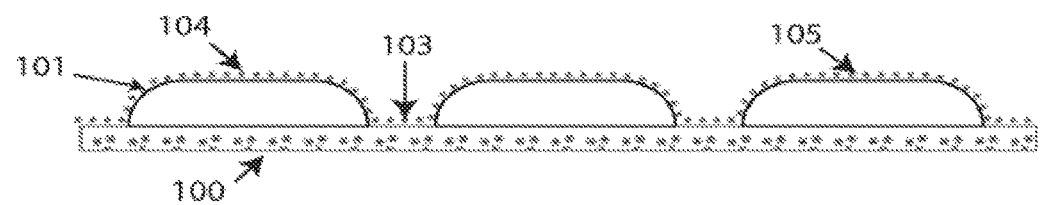
Figure 1R:
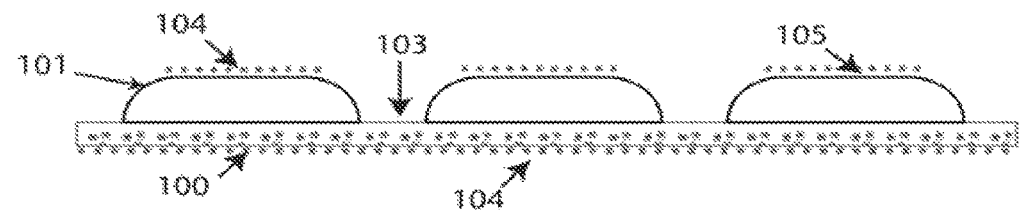

The disclosure is not limited by the embodiments that are described herein. These embodiments serve only to exemplify aspects of the disclosure.

For example, while examples of the disclosure are described primarily in the context of SUPERFABRIC, examples of the disclosure are not limited to that particular assembly of flexible substrate and guard plates in all instances. Any suitable flexible substrate and guard plates may be used. The term SUPERFABRIC and example fabric assembly may be used interchangeably in this disclosure.

In some examples, the flexible substrate may be a flexible fabric substrate. The fabric substrate may a knitted, woven, and/or non-woven fabric. In some examples, the guard plates may be a cured polymer resin guard plate. Suitable polymeric compositions for forming the guard plates may include epoxy resin(s). In one embodiment, the plates may be formed of heat-cured epoxy resin. Another example of an appropriate resin may be ultra-violet (UV) cured acrylate. Depending on the particular application, the plates on the fabric substrate may have a hardness between about 70 and about 100 Shore D, such as, e.g., between about 80 and about 95 Shore D. The hardness of the guard plates may depend on a number of factors including, but not limited to, the polymeric resin composition used to form the plates and/or the process used to cure the polymeric resin composition after being deposited on the surface of flexible substrate. In some embodiments, the guard plates may comprise a thermoset epoxy. In some embodiments, the guard plates may comprise inorganic filler particles. Thermally cured polymeric materials used for guard plates may be relatively hard and crack-resistant.

In some example, the polymer resin selected for use to form guard plates may ensure a strong bond between the guard plate and the fabric substrate base material. In some examples, a suitable polymer resin for construction of guard plates is a one-part heat-curable epoxy resin formulated to (i) provide abrasion resistance, (ii) be screen printable, (iii) be resistant to fracture, (iv) be bondable to the base material, and (v) have good shape definition during printing and curing of the guard plate material. Such resins may be readily formulated to meet these criteria and are available from, for example, Fielco Industries, Inc., Huntingdon Valley, Pa., 19006, which has formulated resins that may meet the characteristics set forth in this paragraph and has given them the designations: TR21 and TR84. Other examples of suitable resin formulations are available from Hexion Specialty Chemicals, Columbus, Ohio 43215.

For example, Hexion Starting Formulation 4019 may be a suitable thermosetting heat curable epoxy base resin formulation. In some examples, abrasion resistance provided by guard plates can be increased by adding small particles (e.g., 1 to 100 micrometers) of silica, alumina, silicon carbide, titanium oxide and the like to the resin.

Additional information on embodiments of materials, including resins and fabrics, and processes that could be used to produce the guard plate geometries of this disclosure are described in U.S. Pat. No. 7,018,692 filed Dec. 31, 2001 and U.S. Pat. No. 6,962,739 filed Jul. 6, 2000 (both incorporated herein by reference). Another embodiment of this disclosure could be a second layer of polygons (guard plates) formed on top of a first layer of polygons (guard plates) as described in U.S. Pat. No. 7,018,692 filed Dec. 31, 2001. In some embodiments, the fabric substrates for the designing fabric could be woven or nonwoven and made of natural, for example, cotton, or synthetic, such as polyester or nylon. The polymeric resin used for the polygons can be, as described above, thermoset epoxy resin. The entire content of each of the patents and published patent applications described in this disclose is incorporated herein by reference.

In some aspects, this disclosure is directed toward an antimicrobial SUPERFABRIC or other antimicrobial fabric assembly. The SUPERFABRIC itself may be a breathable, stain resistant, abrasion resistant and flexible fabric having an array of closely spaced, non-overlapping and well designed and engineered guard plates with high degree of resistance to stain, abrasion, and wear.

The guard plates may be arrayed in any number of patterns, e.g., as shown in FIG. 3. Some patterns are especially designed to enhance the wear resistance and increase the durability of the SUPERFABRIC, other patterns enhance the flexibility while others are primarily designed to make SUPERFABRIC especially attractive in its intended application.

SUPERFABRIC is manufactured, patented and trade marked by Higher Dimension Materials Inc., also known as the SUPERFABRIC Company, located on 570 Hale Avenue North, Oakdale, Minn. 5512, USA.

In some examples, the antimicrobial activity of the SUPERFABRIC or other fabric assembly may be achieved by four different approaches. One approach is to include antimicrobial agent in the formulation of the guard plates followed by printing and curing. In a second approach, the antimicrobial agent is contained in or on the substrate fabric upon which the guard plates are affixed. In a third approach the antimicrobial agent is included in the guard plate formulation and the guard plates are subsequently printed and cured on a substrate that already contains and antimicrobial agent. In a fourth approach the antimicrobial agent is applied as a coating to the SUPERFABRIC or other fabric assembly surface. If there is a need to further increase the antimicrobial activity, then one can apply the antimicrobial agent on the antimicrobial SUPERFABRIC assembly.

The new antimicrobial SUPERFABRIC or other antimicrobial fabric assembly may be carefully designed so it maintains SUPERFABRIC attributes such as durability, flexibility, breathability, stain resistance and the resistance to abrasion, wear, in addition to its newly acquired antimicrobial activity. The antimicrobial activity of the SUPERFABRIC or other fabric assembly may be altered to match the application guidelines and requirements.

Example of the new fabric assembly may find many applications in the marketplace where extra hygiene environment is necessary such as upholstery for an infant's sofa or crib; surface covering and upholstery for infant changing tables, public transportation waiting areas, public transportation seating; sportswear, underwear, or garments for healthcare workers such as surgical drapes, surgical scrubs and aprons; in healthcare facilities, such as walls, upholstery, and equipment. Examples may be useful in scrub pads and cleaning cloths.

Examples of antimicrobial SUPERFABRIC or other antimicrobial fabric assemblies may establish a new paradigm in textiles because of the large number of nearly contradictory functionalities that are combined into a single fabric. For example, in the context of SUPERFABRIC, it is already known world-wide for its durability properties of wear resistance, stain resistance, stability to environmental conditions while maintaining the flexibility normally associated with traditional woven, non-woven, or knit fabrics. SUPERFABRIC may attain this remarkable combination of properties by having an array of closely spaced, non-overlapping and well designed and engineered guard plates separated from one another by small gaps comprised of a substrate fabric.

The addition of antimicrobial properties to SUPERFABRIC or other such fabric assembly may extend the applicability the assembly to the prevention of the transmission of disease by fomites whether that be by community-acquired infection or nosocomial infection.

Figure 1S:
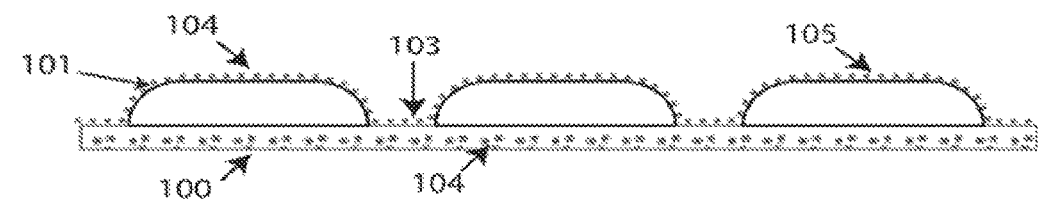

The component parts of the disclosure are illustrated in FIGS. 1(a)-1(s). The substrate fabric is illustrated by (100). The guard plate by (101). The gap by (103) and a portion of an antibacterial agent by (104). Item (105) is a coating of antimicrobial agents. Without limitation, the antimicrobial agent is to be understood as a collection of antimicrobial agents in any combination. Likewise, without limitation, antimicrobial agents in different parts of the construction may be the same or different than those in other parts.

In a first embodiment of the disclosure, FIG. 1(a) one or more suitable antimicrobial agents (104) are incorporated into the material of the guard plates (101) that may give SUPERFABRIC or other fabric assembly wear resistant, stain resistant, and/or other durability properties. An example material used in the guard plate (101) construction is an epoxy resin that is formulated from a variety of epoxy curable materials, curing agents, and fillers that give the guard plates (101) their required properties. Suitable antimicrobial materials (104) can be added to the epoxy resin during its formulation that will give the guard plates (101) the antimicrobial action. Since the antimicrobial agent (104) in an appropriate amount is uniformly mixed with the resin during its formulation, there will be a certain surface concentration of microbial agent on the surface of the guard plate (101) that will afford the fabric its antimicrobial properties. In this embodiment, no antimicrobial agent is shown in or on the substrate fabric (100) nor in the gap (103).

A specific advantage of this first embodiment may be that the guard plate (101) acts as a reservoir of antimicrobial agent (104). This reservoir of antimicrobial agent (104) gives a fabric assembly such as SUPERFABRIC a property that is termed "antimicrobial regenerative." This property, described as follows, serves as the definition of this property: As the guard plate (101) wears, fresh antimicrobial agent (104) is exposed at the surface of the guard plate (101). In such manner, the antimicrobial action is constantly renewed at the surface of the fabric. The material properties of the guard plate (101) that govern wear and stain resistance can be controlled so that cleaning actions, such as laundering a garment containing the fabric or scrubbing a surface comprised of the fabric, will ensure that both sufficient antimicrobial surface concentration is restored to the surface through such cleaning while maintaining excellent overall durability of the fabric that is afforded by the excellent wear resistance for which SUPERFABRIC is already known.

In some embodiments of guard plate constructions used in some examples of the disclosure, the guard plates are composed of epoxy resins with fillers such as sand particles, glass particles, titanium dioxide particles, metal particles and many others that in combination with the specific epoxy resins used determine the physical properties of the guard plates. Physical properties affected by these combinations include the shore hardness, storage modulus, loss modulus, surface texture, ductility, fracture resistance and many others. These physical properties, in turn govern the actual rate of abrasive wear of the guard plates under various conditions such as rubbing, cleaning with chemicals, laundering, or weathering. For example, using epoxy resins with high glass transition temperatures, with curatives that ensure the maximum extent of cure, and fillers such as glass spheres or metal particles, one may create an example fabric assembly of the disclosure with guard plates that survive more than a million double rubs when subjected to the Wyzenbeek abrasion test or survive more than 4000 cycles on a Taber abrasion test. By comparison, standard vinyl upholstery material will survive about 30,000 Wyzenbeek double rubs and survive about 500 Taber cycles. The standard vinyl upholstery material may be treated with a standard antimicrobial such as triclosan and have its antimicrobial action last through a dozen cleanings with antiseptics such as bleach solutions. The example fabric assemblies with guard plates such as those described above using epoxy resins with high glass transition temperatures, with curatives that ensure the maximum extent of cure, and fillers such as glass spheres or metal particles will produce upholstery material that will last many times longer, but one may be concerned that the surface silver zeolites in the guard plates may be depleted by repeated exposure to virulent microbes. In this case one could adjust the guard plate composition to include a rubbery moiety as part of the epoxy curing package and balance some of the glass filler materials with titanium dioxide or zinc oxide particles. These changes will make the guard plate a bit softer and reduce its abrasion resistance. By proper formulation one can, for example, produce guard plates that will withstand 500,000 Wyzenbeek rubs and 1500 Taber cycles. The guard plates will wear a bit faster all the while exposing fresh silver zeolite material that was embedded within the guard plate and had never been exposed to any microbe environment. One then has developed an upholstery material that will still be much more durable than the vinyl under standard use conditions, but will always have fresh antimicrobial action that will never need to be regenerated over the life of the material.

In a second embodiment of the disclosure, FIG. 1(b), antimicrobial agents (104) are embedded in the guard plates (101) as in embodiment 1, but additional antimicrobial agents are added in a coating (105) that is placed on the top of the guard plates (101). The antimicrobial agents in the coating (105) may be the same or different than those in the guard plates (101). Likewise, the antimicrobial agents in either the coating (105) or in the guard plates (101) may be a combination of any antimicrobial agents in any proportion to one another.

In another embodiment of the disclosure, FIG. 1(c), antimicrobial agents (104) are embedded in the guard plates (101), antimicrobial agents are added in a coating (105) that covers both the guard plates (101) and covers the exposed fabric (100) in the gaps (103). The antimicrobial agents in the coating (105) may be the same or different than those on the guard plates (101) and in the gap (103). Likewise, the antimicrobial agents in either the coating (105) or in the guard plates (101) may be a combination of any antimicrobial agents in any proportion to one another.

In another embodiment of the disclosure, FIG. 1(d), antimicrobial agents are embedded in the guard plates (101), are placed in a coating (105) that is on top of the guard plates, and antimicrobial agents (104) are placed on the bottom side of the substrate fabric. The antimicrobial agents (104) in all parts of the construction may be the same or different than those in other parts of the construction. In this embodiment, the gaps (103) do not contain antimicrobial agents (104) nor does the fabric (100) have any antimicrobial agents (104) embedded within its structure.

In another embodiment of the disclosure, FIG. 1(e), an antimicrobial coating is added to the substrate fabric (100) that is exposed in the gaps (103) of the embodiment shown in 1(d). The antimicrobial agents in different parts of the construction may be the same or different than those in other parts of the structure.

In another embodiment of the disclosure, FIG. 1(f), antimicrobial agents (104) are embedded both in the guard plates (101) and in the substrate fabric (100). Without limitation, the antimicrobial agents (104) may be a mixture of antimicrobial agents in any proportion and the antimicrobial agents in different parts of the construction may be the same or different as those in other parts. This embodiment does not envision a coating on the fabric (100) on top of the guard plates (101) nor in the gap (103).

In another embodiment of the disclosure, FIG. 1(g), antimicrobial agents (104) are embedded in the guard plates (101), are contained in a coating on the top of the guard plates (101), and are contained in the fabric (100). This embodiment does not envision antimicrobial agents in the gap (103) or on the bottom side of the fabric (100). The antimicrobial agents in different parts of the construction may be the same or different than those in other parts of the construction.

In another embodiment of the disclosure, FIG. 1(h), antimicrobial agents are contained in the guard plates (101), are contained in a coating (105) that covers the guard plates (101), and covers the fabric (100), partially or wholly, in the gap (103). No antimicrobial coating is applied to the bottom side of the fabric (100). The antimicrobial agents in different parts of the construction may be the same or different than those in other parts of the construction.

In another embodiment of the disclosure, FIG. 1(i), antimicrobial agents (104) are included in the guard plates (101), in the fabric (100) and on the bottom side of the fabric (100).

In another embodiment of the disclosure, FIG. 1(j), antimicrobial agents are included in the guard plates (101), In a coating (105) that covers the guard plates and extends into the gaps (103). Antimicrobial agents are also contained in the fabric (100) and on the bottom side of the fabric (100). The antimicrobial agents in different parts of the construction may be the same or different than those in other parts of the construction.

In another embodiment of the disclosure, FIG. 1(k), no antimicrobial agent is included in the guard plate (101). This may be required for certain types of guard plate materials that may be incompatible with antimicrobial agents (104) that may be embedded in the guard plate (101). In this case, antimicrobial protection is afforded by a coating (105) on the guard plates (101) that contains the antimicrobial agents (104). Said agents shall be regarded as including any combination of antimicrobial agents in any proportion to one another. In another embodiment of the disclosure, FIG. 1(*l*), the antimicrobial agents (104) are contained in a coating that covers the guard plates (101) and the fabric (100) in the gaps (103) partially or wholly.

In another embodiment of the disclosure, FIG. 1(*m*), antimicrobial agents are contained in a coating (105) on the top of the guard plates (101) and on the bottom side of the fabric (100).

In another embodiment of the disclosure, FIG. 1(*n*), antimicrobial agents (104) are contained in a coating that covers the guard plates (101) and the fabric (100) in the gaps (103) wholly or partially, and on the bottom side of the fabric (100).

In another embodiment of the disclosure, FIG. 1(*o*), antimicrobial agents (104) are contained in the fabric (100) only.

In another embodiment of the disclosure, FIG. 1(*p*), antimicrobial agents (104) are contained in a coating on the top of the guard plates (101), and in the fabric (100).

In another embodiment of the disclosure, FIG. 1(*q*), antimicrobial agents (104) are contained in a coating covering the guard plates (101) and the fabric (100) in the gaps (103) wholly or at least partially. There are also antimicrobial agents (104) in the fabric (100).

In another embodiment of the disclosure, FIG. 1(*r*), antimicrobial agents (104) are contained in a coating (105) on the guard plates, in the fabric (100), and in a coating on the bottom side of the fabric (100).

In another embodiment of the disclosure, FIG. 1(*s*), antimicrobial agents are included in the coating (105) on the guard plates and on the fabric (100) in the gaps (103), wholly or at least partially, in the fabric (100), and in a coating (105) on the bottom side of the fabric (100).

In all of the embodiments 1(*a*) through 1(*s*) it is understood that the antimicrobial agents (104) may be mixtures of the individual types of antimicrobial agents in any proportion. It is also understood that antibacterial agents and the mixtures thereof in different parts of an invention structure; guard plates (101), fabric (100), gap (103), or coatings (105) may be the same or different than those in other parts of the structure.

In any of the embodiments 1(*a*) through 1(*s*) thus disclosed or in any other embodiment of the disclosure, other guard plate characteristics such as the size, shape or surface texture may be controlled to prevent the formation of a biofilm. Some pathogens tend to build their own scaffolds on fomite surfaces that form a film that both nurtures pathogen growth and protects the pathogen from the effects of disinfectants and cleaning agents. SUPERFABRIC guard plates made from epoxy have a low surface energy and are inherently stain resistant so the pathogen scaffold material does not easily stick to the guard plate. Guard plates are separated from one another by a gap that prevents a biofilm from spreading across the surface of the entire fabric, and guard plate surfaces can be made smooth and convex so that biofilm attachment is more difficult and biofilms are more easily removed. FIGS. 2*a*-2*d* shows some typical surface profiles for guard plates that serve different purposes. The smooth rounded guard plate surface profile shown 2(*d*) is anticipated to best resist the formation of a biofilm. Item (201) is the substrate fabric, (202) is a guard plate that is short, (203) is a tall guard plate, (204) is a guard plate with a rough textured surface, and (205) is the smooth, convex guard plate anticipated to best foster cleaning and prevent biofilms.

Aspects of the examples of FIGS. 1(*a*)-1(*s*) are further described below.

Embedding in guard plates: An example of how antimicrobial agents are embedded in guard plates is to mix the antimicrobial agent such as silver zeolite, silver glass, or metallic silver (in either nanoparticulate or micro-particle forms) into the guard plate formulation such as an epoxy resin. Typical concentrations of silver zeolite in guard plate formulations are in the about 2% to about 7% by weight silver zeolite to total guard plate formulation weight. For metallic silver particles added as a component to an epoxy formulation, the weight of silver ranges from 3 mg/(kg of guard plates) to approximately 3000 mg/(kg of guard plates).

Antimicrobial Agent as a Coating on Guard Plates:

There are a variety of ways to incorporate antimicrobial agents into a coating on the guard plates. In one example, silver zeolite particles are mixed into a suitable polymer matrix such as liquid polyurethane in a proportion of about 2% to about 3% of the weight of polyurethane. The liquid polyurethane containing the zeolite may then be applied to the surface of the guard plates by any suitable method such as spray coating or roll coating. For the spray method, one may use a suitable mask to constrain the application of the polyurethane/silver zeolite mixture to cost the guard plates only and avoid coating the substrate fabric. When using a roll coating method, the roller properties, such as the durometer of rubber use on a rubber roller, may be chosen to apply the coating to the surface of the guard plates only and not force the polyurethane silver zeolite mixture into the gaps between the guard plates. The specific choice of durometer depends on the height of the guard plates above the substrate, the rheological properties of the specific polyurethane/silver zeolite mixture being used, the pressure used on the roll application process and the speed of the roll coating process. The polyurethane/silver zeolite mixture is then cured by standard polyurethane curing methods such as heating in an oven.

Antimicrobial Agent as a Coating on Both Guard Plates and Substrate:

There are a variety of ways to incorporate antimicrobial agents into a coating on the guard plates. In one example, silver zeolite particles are mixed into a suitable polymer matrix such as liquid polyurethane in a proportion 2% to 3% of the weight of polyurethane. The liquid polyurethane containing the zeolite is then applied to the surface of the full SUPERFABRIC construction, both guard plates and substrate fabric, by spray coating. The polyurethane/silver zeolite mixture is then cured by standard polyurethane curing methods such as heating in an oven. A second method to apply antimicrobial agents to both guard plates and substrate fabric is to use a mixture of silane quaternary ammonium compounds in water or methanol solvent. The full SUPERFABRIC construction is then immersed in the liquid mixture in the same manner as traditional textiles are dyed. The fabric is then dried. The silane quaternary ammonium compounds actually react to the surface of the guard plates and to the surface of the substrate and are permanently adhered by the chemical reaction. The application of the silane quaternary ammonium compounds typically applies about 1000 mg/(kg of fabric assembly (e.g., SUPERFABRIC)) to about 4000 mg/(kg of fabric assembly (e.g., SUPERFABRIC)).

Antimicrobial Agent as a Coating on Substrate Only:

the substrate component of SUPERFABRIC or other fabric assembly can be treated by an antimicrobial agent by immersing the fabric in a silane quaternary ammonium solution of silane quaternary ammonium compound in water or methanol. The silane quaternary ammonium reacts with the surface of the fabric providing a permanent bond to the surface of the fabric. The fabric is then removed from the solution and dried in the same manner as traditional textile dying processes. This is done before guard plates are attached to the substrate. The amount of silane quaternary ammonium compound that is attached to the fabric is about 1000 mg/(kg of textile) to about 4000 mg/(kg of textile).

Embedding in Substrate Fabric Only:

In one example, the substrate fabric may be woven from a mixture of traditional yarns and silver metal threads. Such constructions have been used for medical masks and cloths. The amount of silver in these applications range from about 200,000 mg/(kg of textile) to about 300,000 mg/(kg of textile). Guard plates are then attached to this substrate fabric to complete the inventive fabric construction.

In another example, silver nanoparticles are mixed with a polymer such as polyester and threads are spun from the resulting mixture to produce yarns that can be used to make a substrate fabric by traditional textile manufacturing processes. The guard plates are then attached to the substrate fabric to complete the SUPERFABRIC or other fabric assembly construction. The typical amount of silver in such constructions ranges from 1.5 mg/(kg of textile) to about 4,000 mg/(kg of textile).

Discussion of Example Antimicrobial Agents

Any suitable antimicrobial agent may be utilized in examples of the disclosure that function as described herein. For example, the antimicrobial agent may comprise a metal in metallic form, a metal-zeolite, a metal-glass, a metal salt, an organic, a quaternary ammonium compound, a naturally occurring substance, or a combination thereof. In example fabric assembles of the disclosure, the antimicrobial agent may reduce the fabric assembly's surface population of at least one of bacteria, virus, mold, fungus, or algae, e.g., as compared to substantially the same fabric assembly without the antimicrobial agent.

Antimicrobial action may be quantified by measuring the growth of microbes on a control material without antimicrobial agents compared to the growth of microbes on antimicrobial treated material with both materials being subjected to the same microbe growth favorable environment. The reduction is then reported as 1.0 minus the ratio of the number of microbes on the treated material to the number of microbes on the untreated sample. For example, if an untreated sample has 1,000,000 microbes per unit area and under the same conditions a treated sample has 1,000 microbes per unit area, then the antimicrobial action would be reported as 0.999 or as 99.9%. For the types of applications discussed in this disclosure, 99% to 99.9% is a typical target and may be achieved by some examples of the disclosure. Extreme medical applications may require 99.9999% but items such as sportswear where the antimicrobial agents may only be used for odor control may require much lower levels of activity often not even 99%. Examples of the disclosure may tailor the antimicrobial action based on the desired application of the fabric assembly.

During World War II, when cotton fabrics were used extensively for truck covers, these fabrics needed to be protected from rotting caused by microbial attack. To do so, the military treated these fabrics with a mixture of chlorinated waxes, copper and antimony salts that stiffened the fabrics and gave them a peculiar odor. At the time, potential polluting effects of the application of these materials and toxicity-related issue were not a major consideration. As the government and industrial firms became more aware of the environmental and workplace hazards these compounds caused, alternative products were sought. A considerable amount of work was done by the Southern Regional Research Laboratory of the US Department of Agriculture, the Institute of Textile Technology (ITT) and some of the ITT's member mills to chemically modify cotton to improve its resistance to rotting and improve other properties by Acetylation and cyanoethylation of cotton. These treatments had limited industry acceptance because of relatively high cost.

In recent years, antimicrobial finishing of textiles has become extremely important in the production of protective, decorative and technical textile products. This has provided opportunities to expand the use of such textiles to different applications in the textile, pharmaceutical, medical, engineering, agricultural, and food industries. Antimicrobial finishing of textiles protects users from pathogenic or odor-generating microorganisms, which can cause medical and hygienic problems, and protects textiles from undesirable aesthetic changes or damage caused by rotting, which can result in reduced functionality.

In particular, antimicrobial finishing of textiles and other materials is an important means to help control community-acquired (contracted outside of a health care setting) and nosocomial infection (contracted from the environment or staff of a healthcare facility) through episodic fomite transmission of disease and through persistent fomitic reservoirs. A fomite is any object or substance capable of carrying infectious organisms, such as germs or parasites, and hence transferring them from one individual to another. Skin cells, hair, clothing, and bedding are common sources of contamination.

There are many recognized examples of fomite related illness. Martinez, et.al. reports that the occurrence of VRE (vancomycin-resistant enterococci) is strongly associated with patient placement in a room where a prior occupant has had VRE, even after extensive cleaning. An outbreak of Carbapenem-resistant Acinetobacter in the UK was traced to environmental surfaces, including fabric curtains, that served as a fomitic reservoir. Fomite transmission via contaminated beer glasses was implicated in a hepatitis A outbreak among visitors to a pub. Fomite transmission via contamination of a radiant warmer was blamed for the transmission of DNA-identical herpes in a neonatal nursery, resulting in the death of several patients. Fomites have been identified as a likely source for the transmission of chlamydial infection to the eye, especially under humid conditions. Health care facility bio-contamination with fungi has been associated with outbreaks of rheumatoid disease.

A wide variety of surfaces can become contaminated under ordinary conditions. Parainfluenza and herpes simplex both survive on untreated toothbrushes for at least 24 hours. Herpes simplex remains infectious for at least 8 hours on a moist surface. Within 7 days of the onset of a zoster eruption in a hospitalized patient, varicella virus was detected on all tested room surfaces, including the back of a chair, the door handle, the table and the air conditioner filter.

In the 1980's a National Institutes of Health campaign to promote hand washing used a stuffed teddy bear ("T. Bear") as a hand washing spokesperson and as a promotional item. Ironically, a study of 39 sterilized T. Bears released into a pediatric ward found that 100% were colonized with bacteria, fungi, or both within 1 week. Organisms cultured from the bears included *Staphylococcus epidermidis, Staphylococcus aureus*, Alpha Streptococci, *Corynebacterium acnes, Klebsiella pneumoniae, Pseudomonas aeruginosa, Escherichia coli, Micrococcus* sp, *Bacillus* sp, and species of *Candida, Cryptococcus, Trichosporon, Aspergillus* and others.

Killing pathogens on a surface is expected to reduce the population of pathogens for transmission to other surfaces or persons, and one way to kill pathogens is through chemical disinfection. But strong chemical solutions must be applied correctly and left in contact with surfaces for prolonged periods of time. Many materials are not amenable to such treatments, and many environments such as hospital waiting rooms, public transportation waiting rooms, public transportation seating, restaurant seating, baby changing tables in restrooms, and many others do not accommodate such treatments easily.

Given the difficulty of controlling surface contamination through active cleaning, there is a significant appeal to the promise of exotic surfaces that can self-decontaminate after a bio-contamination event—even an unrecognized one.

This disclosure describes such exotic surfaces on SUPERFABRIC that combine excellent antimicrobial efficacy with the other superlative properties of SUPERFABRIC.

Many different compounds are used to impart antimicrobial functionality to textiles, ranging from synthetic organic compounds such as triclosan, quaternary ammonium compounds, polybiguanides, N-halamines, metals such as silver, and naturally derived antimicrobials such as chitosan. Antimicrobials for textiles need to fulfill many different criteria including efficacy against microorganisms, suitability for textile processing, durability, and a favorable safety and environmental profile. These antimicrobial agents differ in their chemical structure, effectiveness, method of application, and influence on the environment. Most antimicrobial agents in the textile industry utilize a controlled-release mechanism. These agents, which are also called, leaching antimicrobials, are not chemically bound to the textile fibers and their antimicrobial activity is attributed to their gradual and persistent release from the textile into their surroundings in the presence of moisture, where they act as a poison to a wide spectrum of bacteria and fungi. Owing to leaching of the agent into its surroundings, the concentration of the active substance in the textile decreases and gradually falls under the limit of effectiveness. This can induce resistance to these substances in microorganisms; in addition, leaching agents do not withstand repeated laundering. A controlled release mechanism can also be found in agents that are chemically incorporated into the fiber surface, but with an active substance that is leachable in water. The important advantage of these agents over other leaching antimicrobial is that they can be regenerated under appropriate conditions.

Example antimicrobial agents of the disclosure may be divided into four families. Naturally occurring substances, quaternary ammonium compounds, organics, and metals. Although some other metals, such as copper, zinc and cobalt, have attracted attention as effective antimicrobial agents for textiles, silver is by far the most widely used in general textiles as well as in wound dressings. It has a MIC value (Minimum Inhibitory Value) of 0.05-0.1 mg/l against *E. coli*. For synthetic fibers, silver particles can be incorporated into the polymer before extrusion or before nanofiber formation using electro-spinning. The treatment of natural fibers with metals can only be undertaken at the finishing stage and various strategies have been devised to enhance the uptake and durability. Cotton has been pretreated with succinic acid anhydride, which acted as ligand for metal ions to enhance the subsequent adsorption of metallic salts ($Ag^+$ and $Cu^{2+}$) and to provide very effective antibacterial activity.

Naturally occurring substances are materials that can be obtained or manufactured from a number of biological organisms such as plants. One example is turmeric, which is an ancient coloring spice of Asia. Turmeric is a main source of curcumin that has traditionally been used for many remedies. It has been used as an antimicrobial agent in textiles acting as a suppressor for microbial growth in cotton, wool, and rabbit hair.

Quaternary ammonium compounds, such as silane quaternary ammonium compounds, irreversibly bind to the phospholipids and proteins of the membrane, thereby impairing membrane permeability.

Organics, generally regarded as antiseptic and disinfectant materials, include but are not limited to Triclosan (2,4,4 hydrophenyl trichloro (II) ether), n-octyl-isothiazolinone (OIT), benz-isothiazolinone (BIT), and 10,10'-oxybisphenoxarsine (OBPA). Trichlosan acts by permeating the bacterial cell wall and targets multiple cytoplasmic and membrane sites such as RNA synthesis, the production of macromolecules and blocks the synthesis of fatty acids.

Metals are defined as a broad classification consisting of but not limited to metals in their metallic form such as silver, zinc and copper, to metal cations either free or embedded in glass or zeolite structures, and to metal salts and metal oxides.

Figure 5:
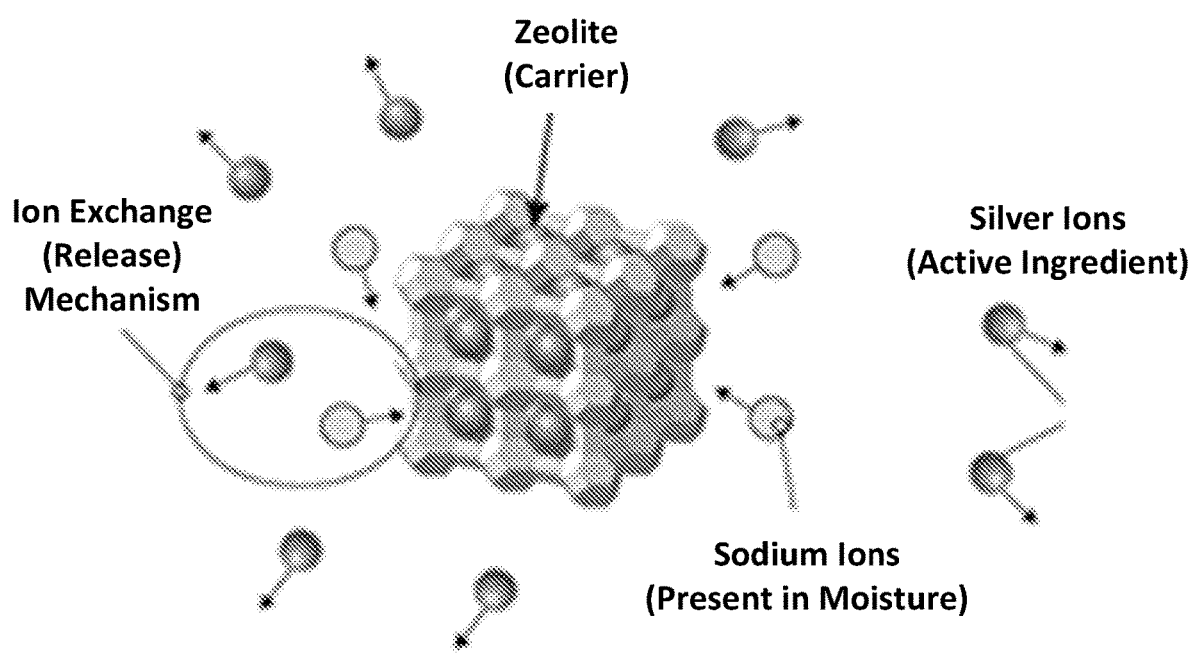
FIG. 5 is a conceptual diagram illustrating the ion exchange mechanism of silver zeolite that enables and controls the release of Ag+ ions into a microbe rich environment.

A novel delivery method for metal cations is to embed the cations in a porous medium that, under proper conditions, will release the metal cation and deliver its killing action to microbes only on demand. Zeolite is a well-known porous structure that can house metal ions in its pores. Ions enter and exit the pores through ion exchange. FIG. 5 (which may be found at http://www.pfonline.com/articles/silver-bullet) is a conceptual diagram illustrating the ion exchange mechanism of silver zeolite that enables and controls the release of Ag+ ions into a microbe rich environment. The microbes are then exposed to the Ag+ ions and are killed by the mechanisms discussed below.

FIG. 5 shows a zeolite carrier particle. These zeolite particles are typically several microns across and have a roughly cubic shape. They have the remarkable property of being porous structures with pores sufficiently large to contain Ag+, Cu++, or K+ ions within the pores. Different zeolite structures can be prepared to best accommodate the cation of interest. The most common cation for antimicrobial purposes is Ag+ so the discussion here is focused on the Ag+ example.

When the silver zeolite particle that contains Ag+ in its pores contacts a moist environment containing Na+ ions and rich with microbes, an ion exchange process occurs that expels Ag+ ions from the zeolite pores into that moist environment and captures the Na+ ions in the pores formerly occupied by the Ag+ ions. As described below, the Ag+ ions are effective biocides and act to kill the microbes in that moist environment. Note that any medium effective in promoting the growth of microbes generally contain Na+ ions as those ions are necessary electrolytes to support microbe cell growth.

Another example of a porous structure that can house Ag+ ions and deliver those Ag+ ions to a moist environment in essentially the same manner as that exhibited by silver zeolite is silver glass. An example glass used to contain metal ions is composed of silicon dioxide, phosphorous pentoxide and calcium carbonate. In normal glass, silicon atoms are highly crosslinked to one another through oxygen atoms. For metallic glasses, the crosslinking is disrupted opening the glass structure forming pores that can house metal ions that act as the antimicrobial agents. These ions can be released in the presence of moisture by the ion exchange process discussed in connection with silver zeolites.

Figure 6:
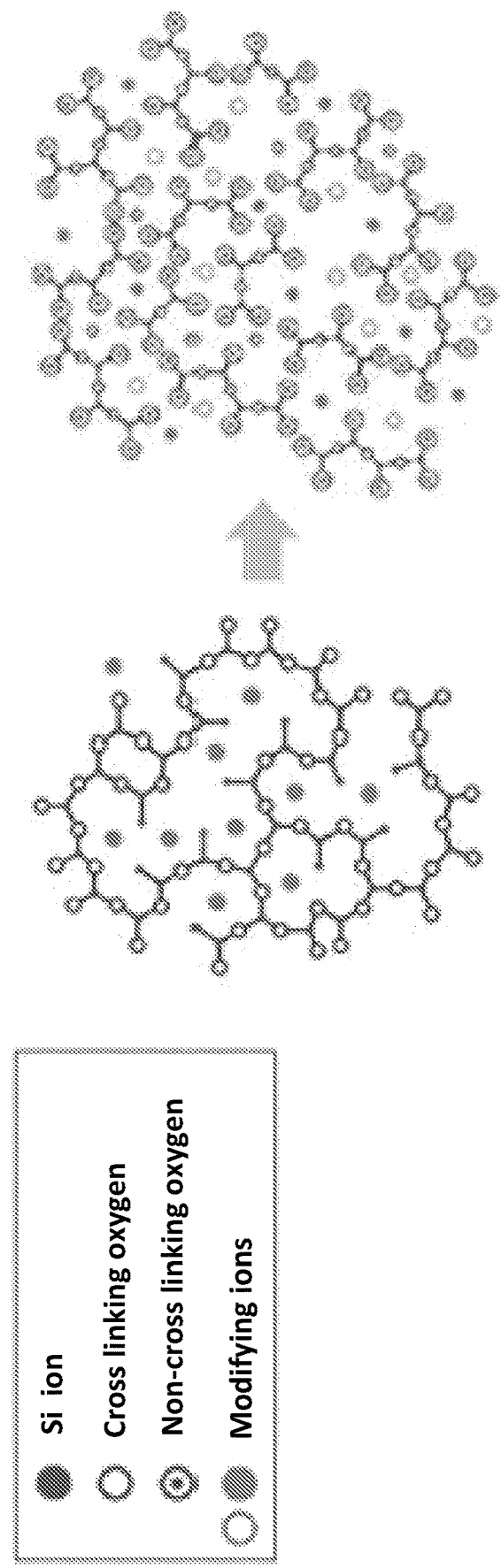
FIG. 6 is a conceptual diagram illustrating how ordinary glass is modified to make a porous silver glass.

FIG. 6 (found at http:www.ishizuka.co.jp/English/material/antimicrobial) is a conceptual diagram illustrating how ordinary glass is modified to make a porous silver glass. In ordinary glass that may contain modifying ions such as Ag+ ions, the silicon atoms are tightly cross linked one to another by oxygen atoms. That forms a structure with small pores that cannot easily swell or change their size in response to a change in moisture or other conditions. As a result, any ions contained in those pores are permanently bound there and cannot participate in an ion exchange process with the external environment. In silver glass the crosslinking oxygen atoms are replaced by oxygen atoms that are also bonded to other elements such as phosphorous. The resulting cross linking is much weaker and the pores in the glass can be disrupted by moisture in the surrounding environment. This makes Ag+ ions in the pores of the silver glass available to ion exchange with environment. As a result the silver glass behaves similarly to silver zeolite in its antimicrobial action For silver, the effective biocide is the silver ion. Silver ions are readily released into aqueous solutions of salts like silver nitrate, but silver ions are only slightly removed from metallic silver. In modern uses of metallic silver as an antimicrobial agent, silver nanoparticles are used to increase the surface area to volume of silver in the metallic silver particle or silver is coated onto a substrate such as small glass spheres. Both approaches reduce the amount of silver that is required by increasing the surface area of silver exposed to microbes while reducing the volume of silver that is used. It is estimated that 50 parts per billion of silver ion released from silver nanoparticles confined in nanoscale cages is enough to cause antimicrobial activity in the conditions of normal water. It is also reported that it takes about 100 silver ions to kill a single bacterium. This agrees with the approximate number of enzyme peptides in a bacterium.

For silver-zeolite and silver-glass, two mechanisms are proposed. One is the action of silver ion itself released from zeolite and the other is that of reactive oxygen species generated from silver in the matrix. The bactericidal efficacy of silver ion is caused by multiple mechanisms including the strong binding of $Ag^+$ with disulfide (S—S) and sulfhydryl (—SH) groups found in the proteins of microbial cell walls, and $Ag^+$ ions disrupting normal metabolic processes by displacement of essential metal ions such as $Ca^{2+}$ or $Zn^{2+}$ leading to cell death. Studies have shown that microbial cultures containing $10^5$ CFU (Colony Forming Units)/ml)1 of *E. coli* K12 W-T, *S. aureus* NCIMB 6571 and *P. aeruginosa* NCIMB 8295 were inhibited (no viable cells were detected) by silver-loaded zeolite in less than 1 h. Such studies have also revealed that as little as 3% of the silver ions in the zeolite are released in each exposure leaving sufficient concentrations of silver ions available for subsequent exposures.

FIG. 7 is a schematic diagram illustrating an example process with which components of plates, gaps, and flexible substrate are combined into a fabric assembly, such as, an assembly in the form of SUPERFABRIC. The left side shows how SUPERFABRIC is assembled from its component parts. The side view shows how the combination of guard plates and gaps gives SUPERFABRIC the flexibility of ordinary fabric. The right portion of the diagram shows example guard plate patterns that give SUPERFABRIC aesthetic appeal in addition to its stain resistance and abrasion resistance properties.

EXAMPLES

Antimicrobial Test results: A sample sheet of antimicrobial SUPERFABRIC was made. The antimicrobial activity of SUPERFABRIC was confirmed at Intertek lab Testing Services, Chemicals & materials, 1 Science Park drive, Singapore 118221 using the Japanese Industrial Standard JIS Z 2801 test method which is the most frequently used by manufacturers for determining antimicrobial activity of a plastic surface. This widely recognized method was drawn up by a consortium of research bodies, universities and manufacturers of antibacterial agents.

A sheet of Antimicrobial SUPERFABRIC sample and a clean control sample were used for the testing. The Antimicrobial SUPERFABRIC sample was formed by printing and curing an epoxy composition on a fabric substrate to form a fabric assembly with an antimicrobial agent contained in guard plates on the surface of the fabric. The epoxy formulation included about 3% by weight Irgaguard B5000 (Silver zeolite antimicrobial agent from BASF).

The first step of the test is sterilization of the surface followed by placing a droplet of a suspension of either *Escherichia coli* or *Staphylococcus aureus* directly onto the surface being tested. The number of viable cells of each microbe was measured in advance. A cover slip is then placed on top of the droplet, thus spreading the bacterial suspension and keeping it in intimate contact with the test surface. The samples are then placed in a chamber with constant conditions of 35° C. and 90% humidity (best conditions to grow bacteria). After continuous 24-hour incubation under these conditions, the test was stopped and the bacterial suspension is released from between the cover slip-test samples sandwich and the number of viable bacterial cells that have survived is determined and compared with the initial number.

The strengths of the JIS Z 2801 method are: (i) Quantitative; (ii) Carried out in triplicate; and (iii) have good reproducibility.

The experimental conditions are more of a best-case scenario for the antimicrobial surface being tested rather than a reflection of the conditions that are likely to occur in a real life situation.

The initial number of *Staphylococcus aureus* microbes on the surface of both control and the number of viable *Staphylococcus aureus* bacteria on control and on Antimicrobial SUPERFABRIC surface, before and after the test, is shown in TABLE 1 below:

TABLE 1

| Sample | *Staphylococcus* | |
|---|---|---|
| | No. microbes at time 0 | No. microbes after 24 hrs |
| Control | 220,000 | 11,000,000 |
| Antimicrobial SUPERFABRIC | 220,000 | 6,700 |

As the table indicates the number of viable bacteria on the surface of the control increased dramatically from 220,000 to 11,000,000 which is in sharp contrast to the number of viable bacteria on the surface of the Antimicrobial SUPERFABRIC which decreased from 220,000 to 6,700. This result confirms without any doubt the effective antimicrobial activity of Antimicrobial SUPERFABRIC surface.

Figure 4:
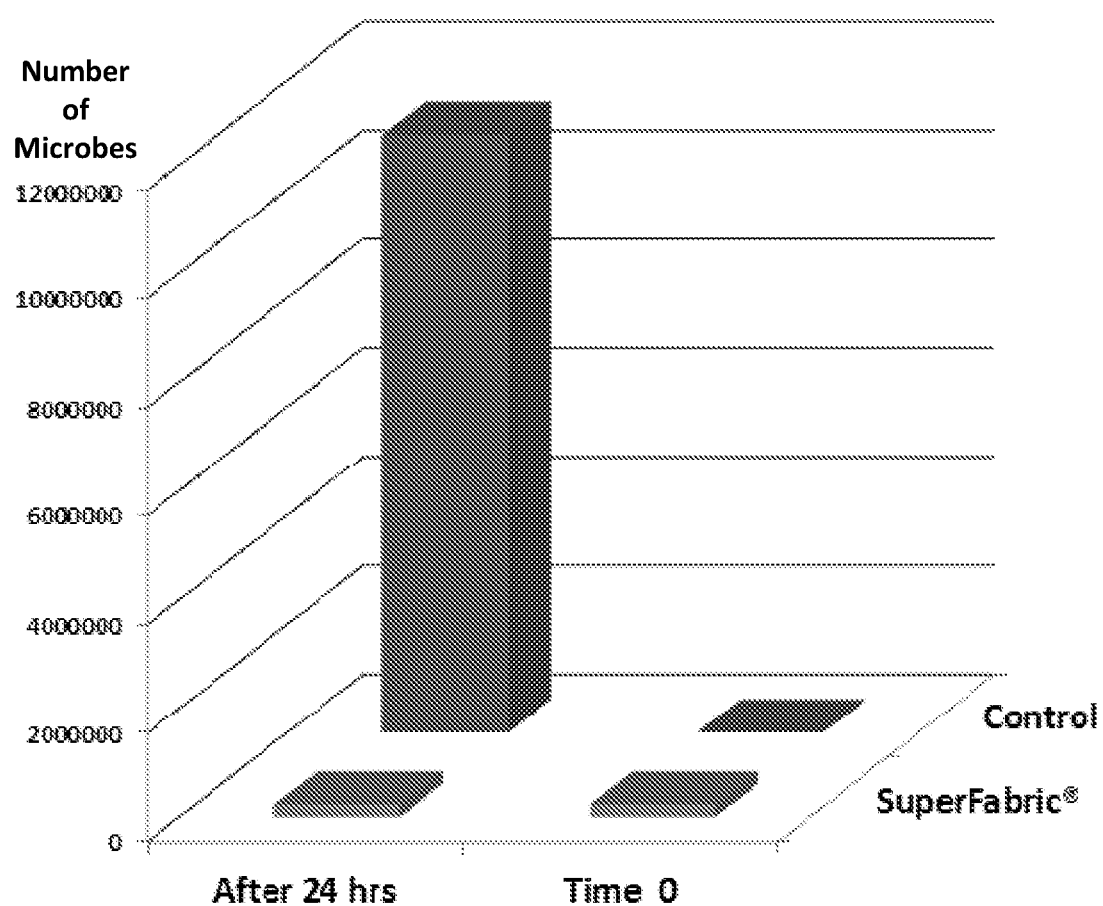
FIG. 4 is a plot illustrating experimental results from testing of an example antimicrobial fabric assembly in accordance with an example of the disclosure.

To demonstrate the dramatic difference between the control surface and the antimicrobial SUPERFABRIC surface, FIG. 4 is a plot that graphically present the numerical test results.

Similarly, the initial number of *Escherichia coli* microbes on the surface of both control and SUPERFABRIC, measured before and after the test, is shown in TABLE 2 below:

TABLE 2

| Escherichia coli | | |
|---|---|---|
| Sample | No. microbes at time 0 | No. microbes after 24 hrs |
| Control | 270,000 | 6,600,000 |
| Antimicrobial SUPERFABRIC | 270,000 | 7,600 |

The percentage of microbe reduction of the Antimicrobial SUPERFABRIC surface is shown in TABLE 3 below:

TABLE 3

| Percentage Microbe Reduction in 24 hrs | | |
|---|---|---|
| Sample | Escherichia coli | Staphylococcus |
| Antimicrobial SUPERFABRIC | 99.94 | 99.89 |

Abrasion, cut resistance & stain resistance testing of Antimicrobial SUPERFABRIC:

A hand print of the Antimicrobial SUPERFABRIC sheet that passed JIS Z2801 described above was compared with a controlled SUPERFABRIC sheet with identical screen and thickness except that Antimicrobial SUPERFABRIC sheet contains antimicrobial agents while the control does not contain the antimicrobial agent.

Abrasion was measured using TABER 5130 Abrader with 1000 g weight on each side of the wheels. The test was stopped when the guard plate was abraded completely and the underlying fabric surface was detected. The cut test was measured using proprietary in house built machine. The stain resistance was done by leaving Ketchup and Italian dressing spots on surface for 1 hour then washed thoroughly with water and looking at clearance of the spot.

Abrasion test: 1205 cycles for both control and sample with % weight loss of 9.91% and 10.02%, respectively.

Cut test: 4.5 lbs. for control and sample

Stain resistance: Stain washed away completely for both sample and control.

What is claimed is:

1. A fabric assembly comprising:
   a flexible substrate including a top surface;
   a plurality of guard plates affixed to the top surface of the flexible substrate and arrayed in a pattern such that a plurality of continuous gaps are defined between adjacent plates; and
   a silver zeolite or silver glass antimicrobial agent contained in the plurality of guard plates at about 2% to about 7% by weight, and
   wherein the antimicrobial agent is selected to reduce the fabric assembly's surface population of at least one of bacteria, virus, mold, fungus, or algae.

2. The fabric assembly of claim 1, wherein the plurality of guard plates are formed of a material that wears away such that fresh antimicrobial agent contained in the guard plates is exposed at a surface of the guard plates as the material wears away to make the fabric assembly antimicrobial regenerative.

3. The fabric assembly of claim 1, wherein the antimicrobial agent is also contained in the substrate.

4. The fabric assembly of claim 1, wherein the antimicrobial agent is also on the plurality of guard plates.

5. The fabric assembly of claim 1, wherein the antimicrobial agent is also on the substrate.

6. A method of forming a fabric assembly, the method comprising depositing a plurality of guard plates affixed to a top surface of a flexible substrate and arrayed in a pattern such that a plurality of continuous gaps are defined between adjacent plates, wherein the fabric assembly includes a silver zeolite or silver glass antimicrobial agent contained in the plurality of guard plates at about 2% to about 7% by weight, and wherein the antimicrobial agents are selected to reduce the fabric assembly's surface population of at least one of bacteria, virus, mold, fungus, or algae.

7. The fabric assembly of claim 1, wherein the antimicrobial agent is not contained in the substrate or on the substrate except for the guard plates.

8. The fabric assembly of claim 1, wherein the antimicrobial agent is selected to reduce the fabric assembly's surface population of the virus.

9. The fabric assembly of claim 1, wherein the fabric assembly forms a garment for a healthcare worker.

10. The fabric assembly of claim 1, wherein the antimicrobial agent is silver glass.

11. The fabric assembly of claim 1, wherein the antimicrobial agent is silver zeolite.

12. The fabric assembly of claim 1, wherein the plurality of guard plates comprise epoxy resin.

13. The fabric assembly of claim 12, wherein the epoxy resin is heat curable.

14. The fabric assembly of claim 12, wherein the plurality of guard plates further comprise a rubbery moiety mixed with the epoxy resin.

15. The fabric assembly of claim 14, wherein the rubbery moiety causes softening of the plurality of guard plates.

16. The fabric assembly of claim 14, wherein the rubbery moiety causes a reduction in abrasion resistance of the plurality of guard plates.

17. The fabric assembly of claim 1, wherein the flexible substrate comprises a woven fabric.

18. The fabric assembly of claim 1, wherein the flexible substrate comprises a nonwoven fabric.

19. The fabric assembly of claim 1, wherein the antimicrobial agent is selected to reduce the fabric assembly's surface population of virus.

* * * * *